United States Patent [19]
Yoshida

[11] Patent Number: 4,677,660
[45] Date of Patent: Jun. 30, 1987

[54] COMMUNICATION APPARATUS SELECTIVELY OPERABLE IN VOICE-COMMUNICATION OR IN IMAGE-COMMUNICATION

[75] Inventor: Takehiro Yoshida, Tokyo, Japan

[73] Assignee: Canon Kabushiki Kaisha, Tokyo, Japan

[21] Appl. No.: 643,463

[22] Filed: Aug. 23, 1984

[30] Foreign Application Priority Data

Aug. 30, 1983 [JP] Japan ................................ 58-157190

[51] Int. Cl.⁴ .............................................. H04N 1/32
[52] U.S. Cl. ...................................... 379/100; 379/373
[58] Field of Search .................. 179/2 R, 2 A, 2 AM, 179/2 C, 2 DP; 379/100, 373

[56] References Cited

U.S. PATENT DOCUMENTS 4,353,097 10/1982 Takeda et al. ............... 179/2 DP X
4,355,205 10/1982 Walker ............................. 179/2 A
4,394,540 7/1983 Willis et al. ...................... 179/2 AM

FOREIGN PATENT DOCUMENTS 2855971 7/1980 Fed. Rep. of Germany ..... 179/2 R
3042885 5/1982 Fed. Rep. of Germany ..... 179/2 R Primary Examiner—James L. Dwyer
Attorney, Agent, or Firm—Fitzpatrick Cella, Harper & Scinto

[57] ABSTRACT

The communication apparatus is provided with a timer for time counting a predetermined time interval and in the case where a control signal was detected witin a predetermined time interval, the automatic reception is done in the facsimile mode and image information is received. In the case where the control signal could not be detected within the predetermined time interval, the communication is done in telephone mode and the voice-communication is performed. Further, with such a constitution, the facsimile mode and the telephone mode are automatically switched, thereby enabling the image reception or voice-communication to be executed in correspondence upon a communication apparatus on the distant side.

5 Claims, 9 Drawing Figures

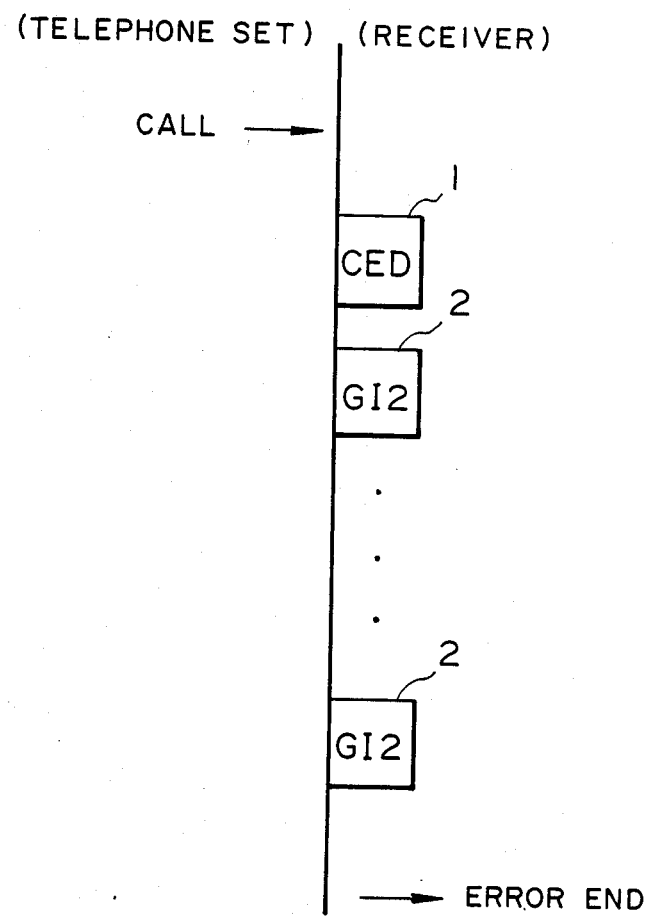
F I G. I

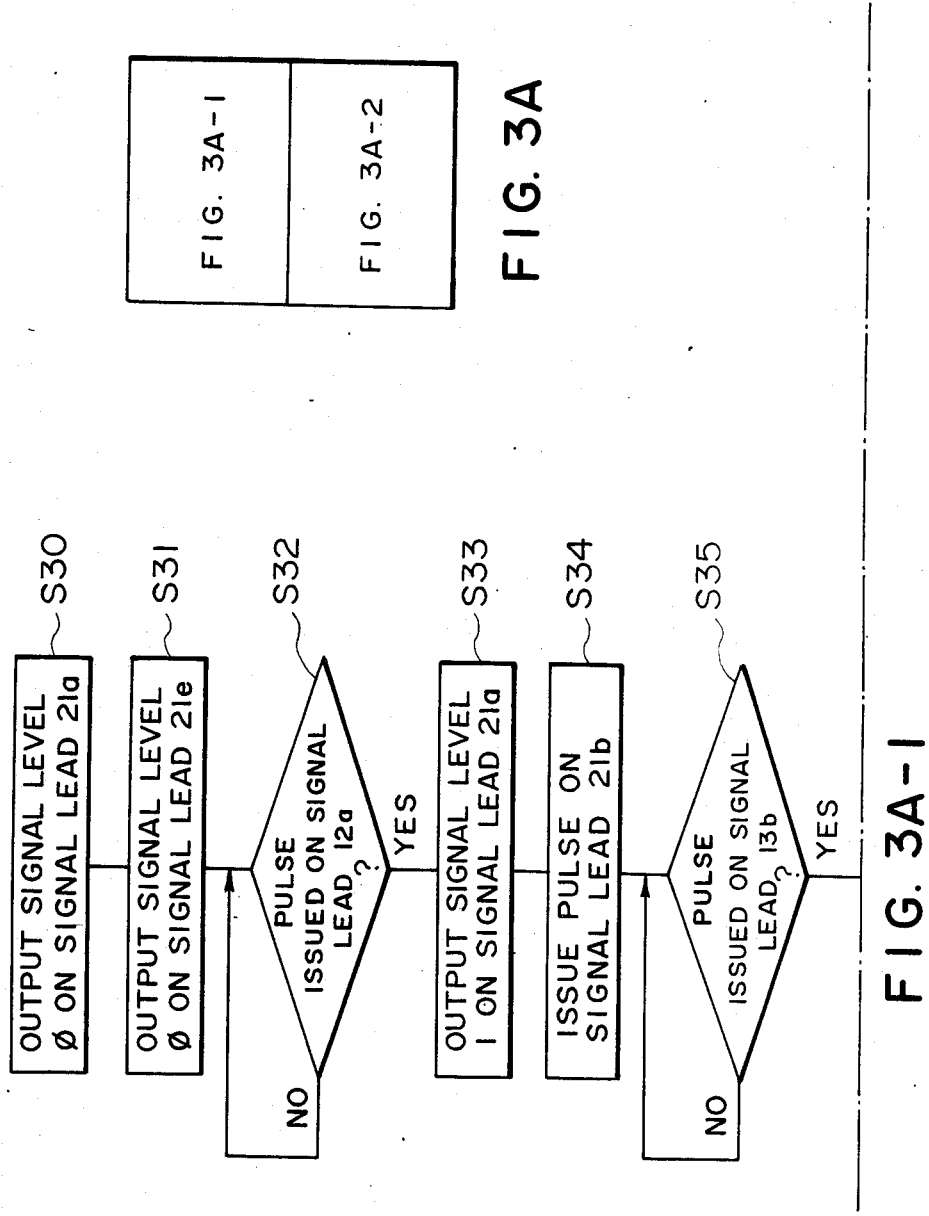

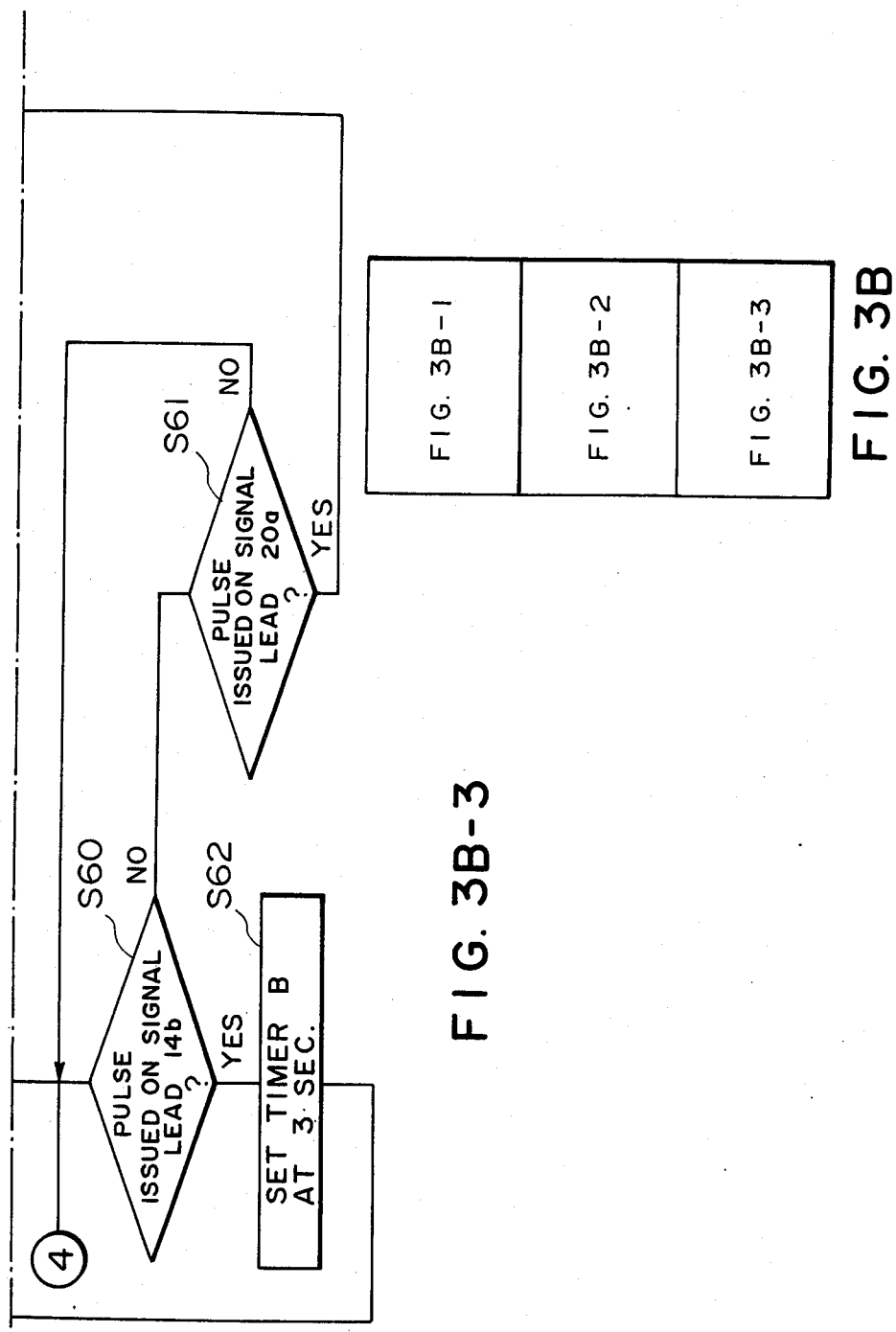

COMMUNICATION APPARATUS SELECTIVELY OPERABLE IN VOICE-COMMUNICATION OR IN IMAGE-COMMUNICATION

BACKGROUND OF THE INVENTION

1. Field of the Invention

The present invention relates to a communication apparatus which can automatically select image communication in the facsimile mode or voice communication in the telephone mode in response to a communication apparatus on the distant side.

2. Description of the Prior Art

As a conventional apparatus of this type, there is known a facsimile apparatus having the automatic reception mode in which an image is automatically transmitted and received in response to a ringing tone signal from a facsimile apparatus on the calling side.

Generally, a facsimile apparatus having the automatic transmitting/receiving function is also provided with the manual reception mode in which the outgoing call or incoming call is performed using an attached telephone set and thereafter the line is switched to the facsimile apparatus and the image communication is executed. In many cases, this automatic-manual switching is performed by a change-over switch provided on an operating panel or the like.

Ordinarily, when the facsimile apparatus is set into the manual mode, a telephone set installed in the facsimile apparatus can be used similarly to an ordinary telephone, and even a call from a public telephone or the like can be received. However, in the case of receiving an original, the operator has to mediate between the transmission and reception sides. Namely, after picking up the handset, the operator has to switch the line to the side of the facsimile apparatus by operating a reception button or a switch.

On the other hand, in the case of the auto reception mode, an image transmitted from the facsimile apparatus can be automatically received. However, in such a case, the ordinary communication function of the telephone set connected to the facsimile apparatus will have been lost, causing the drawback that it is impossible to receive a communication by an outgoing call from a public telephone or the like.

FIG. 1 shows the operation of the facsimile apparatus which has been set into the auto reception mode in the case where it has been called from an ordinary telephone set. This diagram shows the operation of the facsimile apparatus of the G type (group 2) which meets CCITT (International Telegraph and Telephone Consultative Committee) Recommendation T3.

As shown in the diagram, for an outgoing call from an ordinary telephone set, the apparatus which has been set into the auto reception mode first transmits a CED signal 1. This CED signal 1 is a called station identifying signal representing that the called station is the non-voice communication terminal. Subsequently, the facsimile apparatus transmits a GI2 signal 2. This GI2 signal 2 is a group 2 identification signal indicating that the apparatus can perform the communication on the basis of the G2 equipment recommendation method and at least one sheet of original can be received.

Thereafter, the facsimile apparatus waits for a GC2 signal as an identifying signal on the transmitting side corresponding to the GI2 signal 2. However, in the case of an outgoing call from an ordinary telephone set, the GC2 signal obviously will not be transmitted. Therefore, the facsimile apparatus on the receiving side repeats the retransmission of the GI2 signal 2 every three seconds during a predetermined initial identification time interval (ordinarily, for 35 seconds from the first GI2 signal 2, namely, this interval corresponds to about seven transmissions of the GI2 signal 2). If the GC2 signal cannot be received in spite of this repetitive transmission, the facsimile apparatus will have disconnected the line as an error end.

The conventional auto reception is as described above. For instance, the user who has only one telephone line contracted uses the telephone set as an ordinary telephone set as well, so that it is undesirable that the apparatus is always set into the auto reception mode. Consequently, the auto reception mode is a function useless to such a user. In addition, even for such a user, the apparatus is usually set into the auto reception mode at night in the case of communication with foreign countries. If the user forgets to switch the apparatus from the manual mode to the auto mode, the apparatus will not have functioned as the facsimile apparatus in the place where nobody is present at night. Therefore, in a conventional facsimile apparatus, even if both the manual and auto modes are provided, its proper use is troublesome and this results in the user often installing another telephone only for use in the facsimile apparatus. That would make the burden too heavy for the user.

In consideration of the above point, technology has been provided whereby means for identifying a voice on the calling side is provided and the switching of the line is controlled by the voice from the calling side. However, since such an apparatus uses a voice recognizing apparatus, the whole apparatus becomes complicated and this results in an increase in cost and causes the burden for the operator on the calling side to be increased.

The above-mentioned drawback is a common problem for communication apparatuses which perform predetermined communications on the basis of a predetermined protocol by use of telephone lines.

SUMMARY OF THE INVENTION

It is a first object of the present invention to enable the receiver side to be automatically set into the respective reception mode corresponding to a distant apparatus both in the case where a communication apparatus on the distant side is a facsimile apparatus and where image information is received, and in the case where a communication apparatus on the distant side is a telephone set and where voice communication is received.

A second object of the invention is to enable image information to be immediately received in the case where a communication apparatus on the distant side is a facsimile apparatus.

A third object of the invention is to enable voice communication to be performed by calling an operator after the lapse of a predetermined time interval in the case where a communication apparatus on the distant side is a telephone set. Awarding to the present invention, these objects are attained by providing a receiving apparatus in which, in response to detection of establishment of a communications link with a distant apparatus, an image reception mode signal is sent, and if a response to that signal, which response includes a signal representing an image transmission mode of the distant apparatus, is detected within a predetermined time, image signal reception is enabled. If the wanted response from the distant apparatus is no detected within that time, a calling signal is generated to call an operator. This arrangement makes possible efficient and convenient use of the receiving apparatus in both a facsimile and a voice mode, even if, for example, the user has only a single telephone line.

The objects features and advantages of the invention will be more fully appreciated from a consideration of the following detailed description of the preferred embodiment, taken together with the accompanying drawings, in which like reference characters refer to the elements throughout.

DETAILED DESCRIPTION OF THE PREFERRED EMBODIMENT

The present invention will be described in detail hereinbelow with respect to an embodiment shown in the diagrams. In the following description, an example of a G2 facsimile apparatus in conformity to CCITT Recommendation T3 will be explained in detail.

Figure 2:
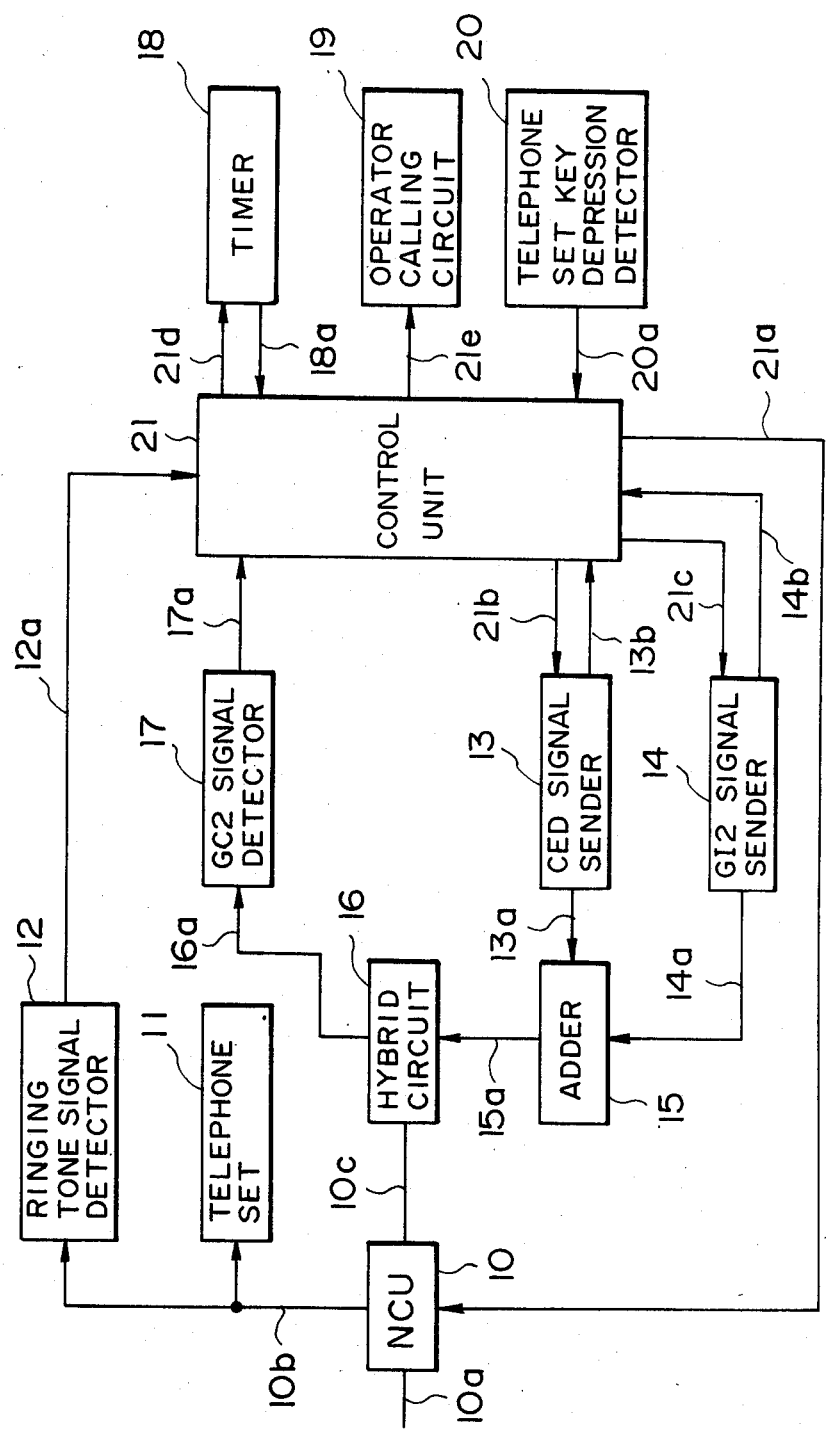
FIG. 2 is a block diagram showing an arrangement of a facsimile apparatus in which the present invention is employed.

FIG. 2 shows a block diagram of one embodiment of a facsimile apparatus according to the present invention.

FIG. 2, a reference numeral 10 indicates a network control unit (hereinbelow, referred to as an NCU). In order to use a telephone network for data communication and the like, the NCU 10 is connected to a terminal of a line 10a and controls the connection of a telelphone network, or switches to a data communication path, or holds a loop. In this invention, an output signal of a control unit 21 is inputted to the NCU 10 through a signal lead 21a and the NCU 10 is constituted in such a manner that it operates so as to connect the line 10a to the side of a telephone set 11, i.e., to a signal lead 10b of the telephone set 11 when a logical level of that output signal is "0" and to switch the line 10a to the side of the facsimile apparatus subsequent to a signal lead 10c when the logical level is "1". However, the line 10a is connected to the signal lead 10b on the side of the telephone set 11 in the ordinary state.

The signal lead 10b is connected to a ringing tone signal detector 12 for detecting the presence and absence of a ringing tone signal sent in response to an outgoing call from the distant side. In the case where the telephone number on this side was dialed from the telephone set on the distant side, this ringing tone signal is sent after the exchanger has confirmed that the telephone on this side is not busy. When the ringing tone signal detector 12 detects a ringing tone signal, it generates a command pulse to a signal lead 12a.

In the diagram, only important components in the transmitting system for procedure signals of the facsimile apparatus as shown. Namely, a CED signal sender 13 and a GI2 signal sender 14 are shown. The CED signal sender 13 outputs the above-mentioned CED signal to a signal lead 13a when a command pulse is generated from the control unit 21 to a signal lead 21b, while the GI2 signal sender 14 generates the above-mentioned GI2 signal to a signal lead 14a when a command signal is generated from the control unit 21 to a signal lead 21c.

These procedure signals to be transmitted are added by an adder 15 and then the added signal is sent to a hybrid circuit 16 through a signal lead 15a. After it has been separated into a transmission signal and a reception signal by the hybrid circuit 16, they are sent to line 10a through the NCU 10. Upon completion of the transmission of the above procedure signals, the CED signal sender 13 and the GI2 signal sender 14 generate command pulses to a signal lead 13b and a signal lead 14b, respectively.

On the other hand, a GC2 signal detector 17 is shown as the receiving system for the procedure signals. The reception signal separated by the hybrid circuit 16 is inputted to the GC2 signal detector 17 through a signal lead 16a. When the GC2 signal detector 17 detects the GC2 signal transmitted from the distant side, it outputs a command pulse to a signal lead 17a.

In addition, the facsimile apparatus of the invention is provided with a timer 18. This timer circuit 18 is started by the control unit 21 through a signal lead 21d immediately after the CED signal has been sent in response to the calling in the state whereby the apparatus was set into the auto reception mode. Thereafter, the timer 18 generates a command pulse to a signal lead 18a after the elapse of a constant time period (twenty seconds in this embodiment). In this embodiment, it is assumed that the distant side is determined to be a voice-communication terminal instead of a facsimile apparatus in the case where the GC2 signal cannot be received within that time interval.

Further, the facsimile apparatus of this embodiment is equipped with an operator calling circuit 19. When the signal level on a signal lead 21e is set to "1" by the control unit 21, the operator calling circuit 19 generates an artificial bell sound or the like, thereby calling the operator.

In order to allow the operator to respond and communicate for the calling by the operator calling circuit 19, the facsimile apparatus of this embodiment is provided with a telephone set button on an operating panel or the like (not shown). A telephone set key depression detector 20 is provided to detect the depression of this telephone set button. When the telephone set button has been depressed, the telephone set key depression detector 20 generates a command pulse to a signal lead 20a. A button which is used for a publicly known polling function or the like may be used as the above telephone set button.

The signals on the signal leads 12a, 13b, 14b, 17a, 18a, and 20a are inputted to the control unit 21, and the control unit 21 performs the following controls through the signal leads 21a, 21b, 21c, and 21d and is constituted by a microcomputer or the like.

Namely, when a ringing tone signal is detected by the ringing tone signal detector 12, the control unit 21 controls the CED signal sender 13 so as to send the CED signal onto the line. Subsequently, after the elapse of 80 milliseconds, the GI2 signal is sent onto the line by the GI2 signal sender 14 and the apparatus waits for the GC2 signal from the distant side.

In the case where the GC2 signal has been detected by the GC2 signal detector 17, the operation similar to that in the conventional auto reception mode is performed and the image receiving operation is executed.

When the GC2 signal from the distant side is to not be detected, the GI2 signal is sent every three seconds similarly to the case of the conventional apparatus and the apparatus waits for the operation for the GC2 signal. In the case where the GC2 signal cannot be detected in spite of the repetitive transmission of the GI2 signal for 20 seconds, it is considered that the calling side is a voice-communication terminal such as a public telephone or the like. Therefore, the operator is called by controlling the operator calling circuit 19. During the interval when this calling is being done as well, the GI2 signal is sent at the above-mentioned predetermined interval by the GI2 signal sender 14 during the initial identification time interval mentioned in conjunction of a conventional example. When the GC2 signal is received during this interval, the calling by the operator calling circuit 19 is stopped and the apparatus enters the ordinary image communication mode.

When the operator responds by the telephone set button within the initial identification time interval, the line 10a is connected to the side of the telephone set 11, thereby making the communication possible. When the operator does not respond within the initial identification time interval, the GI2 signal and the operator calling by the operator calling circuit 19 are stopped and the apparatus returns to the standby mode.

Figures 2, 3A:
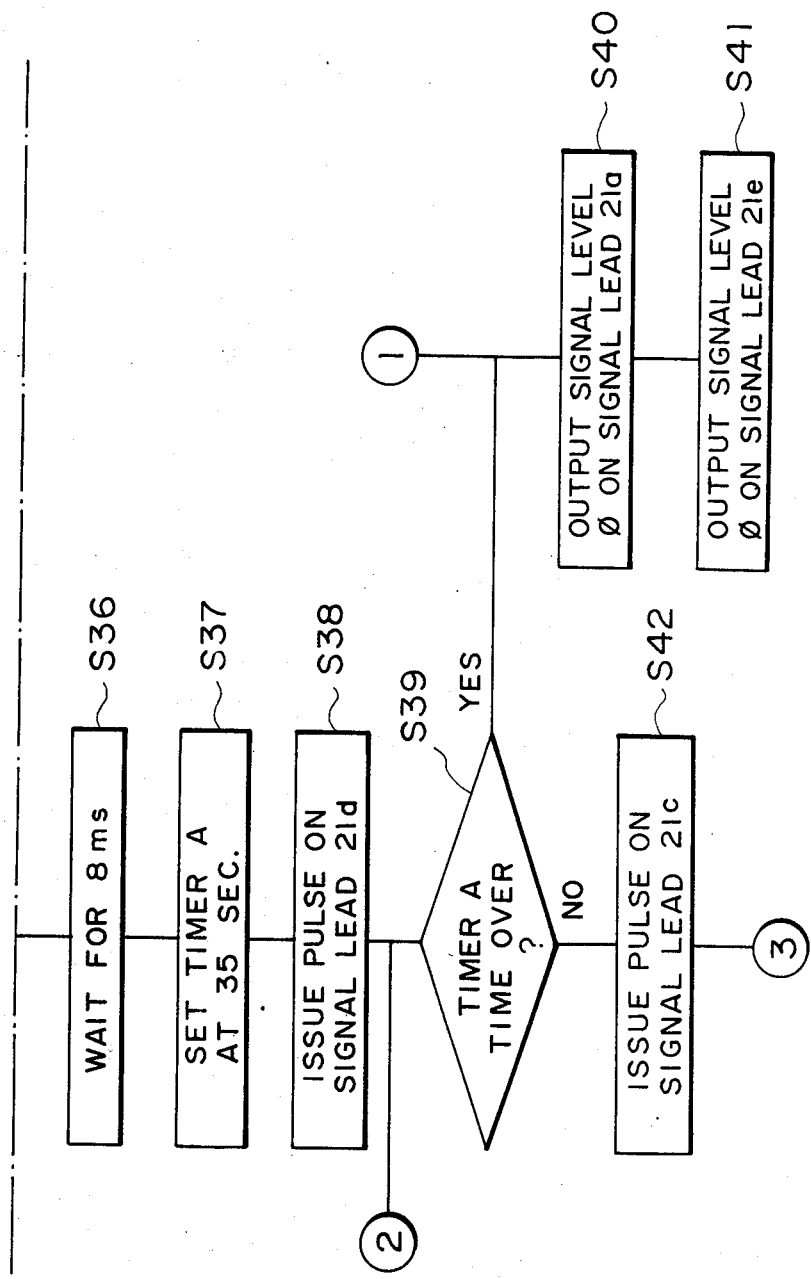
FIGS. 3A composed of FIGS. 3A-1 and 3A-2 and FIG. 3B composed of FIGS. 3B-1 to 3B-3 are flowcharts for explaining an example of the control procedure of a control unit in FIG. 2.
Figures 1, 3B:
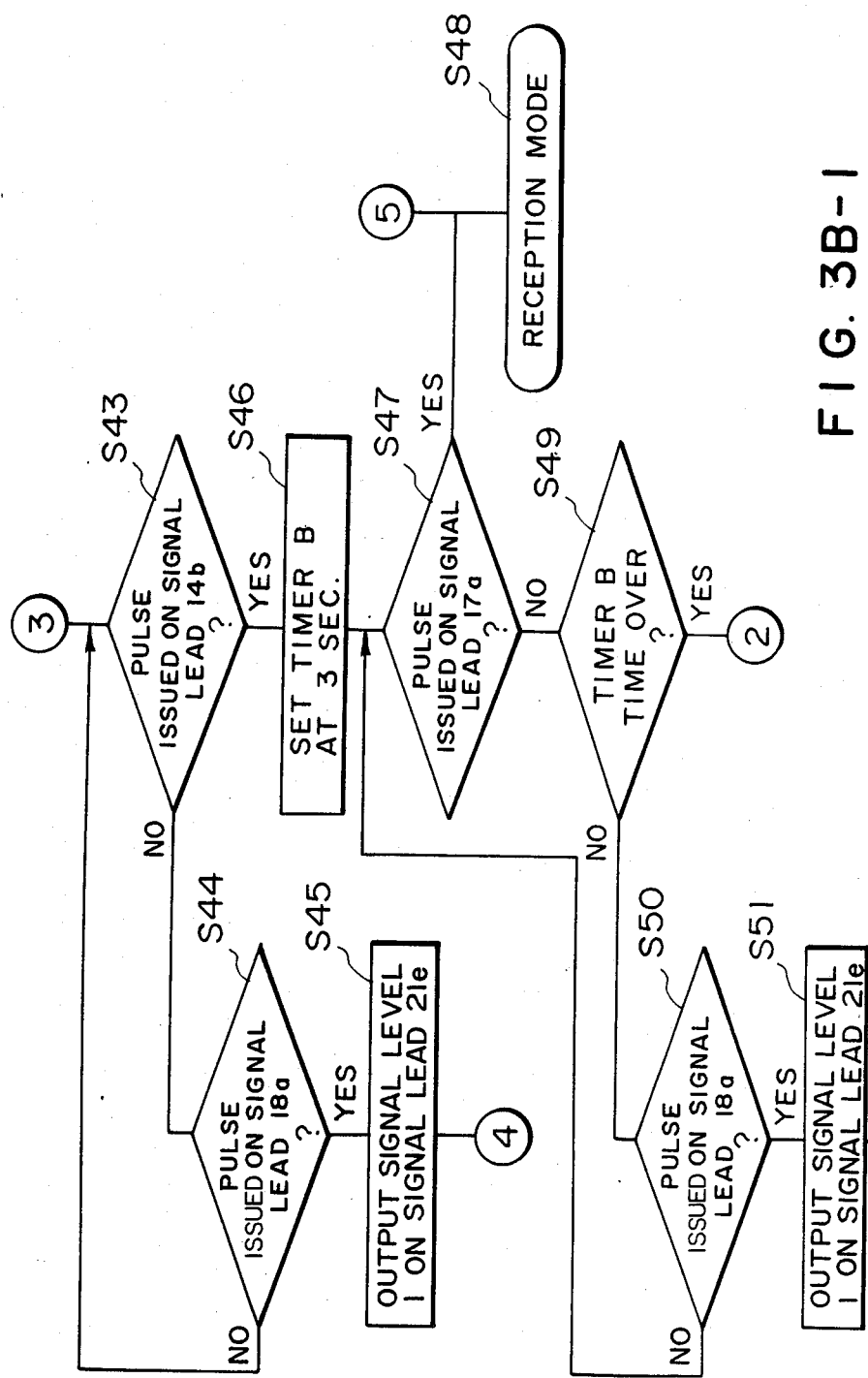
FIG. 1 is an explanatory diagram showing a drawback in a conventional communication apparatus.
Figures 2, 3B:
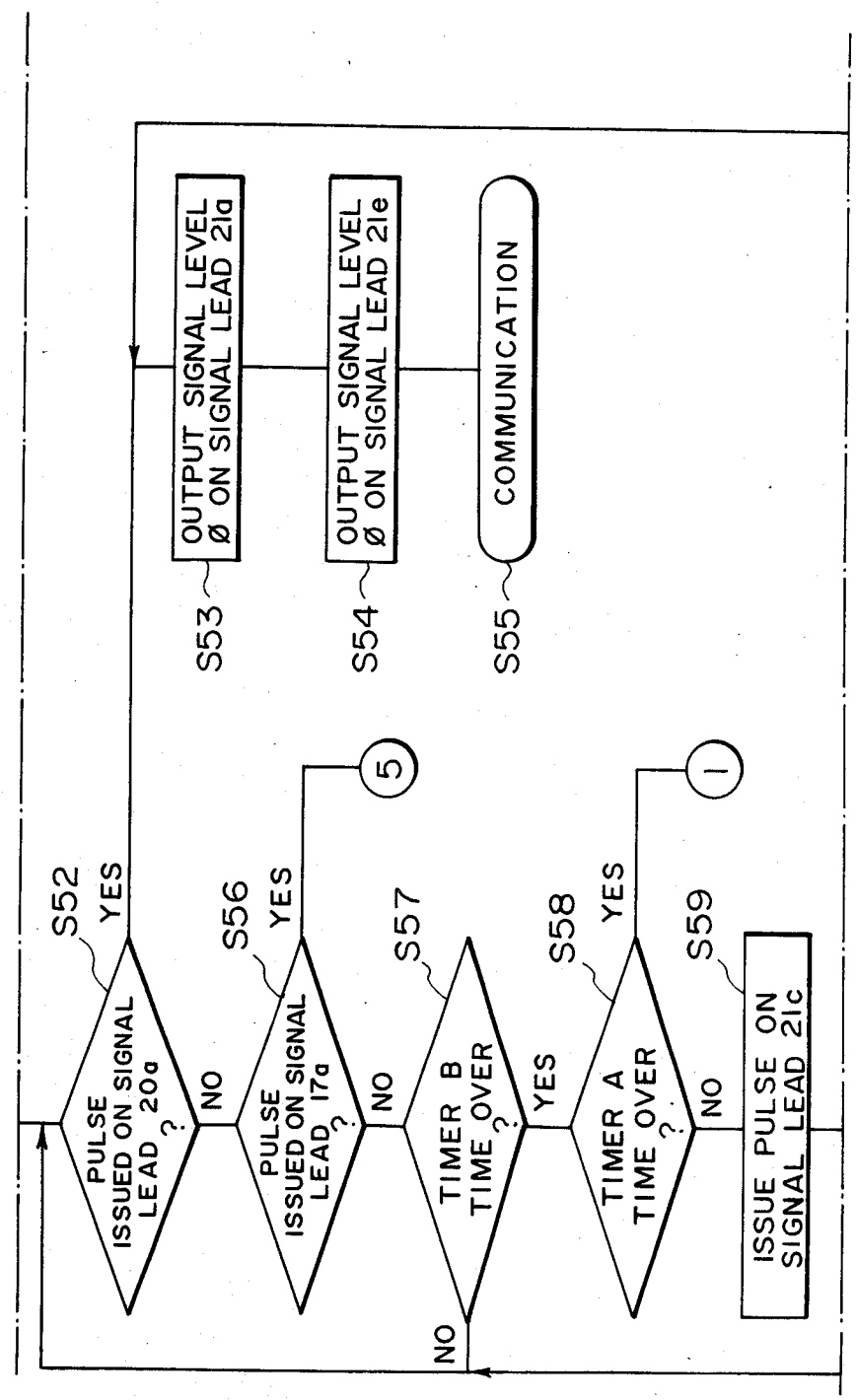

The operation of the control unit mentioned above will be explained further in detail with reference to flowcharts of FIGS. 3A and 3B. It is assumed that the portions designated by the same reference numerals in FIGS. 3A and 3B are connected to the other portions indicated by the same numerals, respectively. The procedures shown here may be stored as a program in an ROM (read only memory) or the like.

In step S30 in FIG. 3A, the control unit outputs a signal level "0" onto the signal lead 21a. Thus, the line 10a is connected to the side of the telephone set 11 by the NCU 10.

Next, in step S31, a signal level "0" is outputted onto the signal lead 21e, thereby stopping the calling of the operator calling circuit 19.

Then, in step S32, the state of the output signal lead 12a of the ringing tone signal detector 12 is checked to see if a command pulse is issued onto the signal lead 12a or not. Namely, the apparatus waits for the transmission of the ringing tone signal from the distant side.

In the case where the ringing tone signal is transmitted and the pulse is issued onto the signal lead 12a, the processing advances the step S33 and a signal level "1" is outputted onto the signal lead 21a, thereby connecting the line 10a to the facsimile apparatus main body subsequent to the signal lead 10c.

Next, in step S34, the control unit 21 issues a command pulse onto the signal lead 21b, thereby allowing the CED signal sender 13 to generate the CED signal. This CED signal is transmitted to the distant side through the line 10a along the above-mentioned path. Next, in step S35, the state of the signal lead 13b is checked and the apparatus waits for the completion of the transmission of the CED signal.

When a command pulse is issued onto the signal lead 13b after the completion of the transmission of the CED signal, step S36 follows and the apparatus waits for the elapse of a predetermined time interval of 80 milliseconds. Subsequently, in step S37, the count time of a timer A provided in the control unit 21 or the like is set at 35 seconds corresponding to the initial identification time interval. Further in step S38, a command pulse is issued onto the signal lead 21d, thereby starting the timer 18 which has been set at 20 seconds.

Next, in step S39, the time counting of the timer A is checked to see if it has finished or not. This discrimination is performed by checking whether a command pulse was issued onto the signal line 18a or not. In the case where the time counting of the timer A has finished, namely, when the initial identification time interval has finished, the processing advances to step S40. Steps S40 and S41 are the routine to carry out the same operations as those in steps S30 and S31. Namely, the line 10a is connected to the side of the telephone set and the calling of the operator calling circuit 19 is stopped and the apparatus is returned to the initial standby mode.

On the other hand, in the case where the initial identification time interval has not ended yet, step S42 follows and a command pulse is issued onto the signal line 21c, thereby allowing the GI2 signal sender 14 to transmit the GI2 signal.

Subsequently, in step S43, the state of the signal lead 14b is checked and the apparatus waits for the transmission of the signal similarly to the case of the CED signal. When the command pulse has issued onto the signal lead 14b, i.e., when the transmission of the GI2 signal has finished, the processing advances to step S46. If not, step S44 follows.

In step S44, it is checked whether a command pulse was issued onto the signal lead 18a or not, namely, whether twenty seconds have passed or not after the starting of transmission of the GI2 signal. When the command pulse has issued onto the signal lead 18a, i.e., when 20 seconds passed after the starting of transmission of the GI2 signal, step S45 follows. On the contrary, when a command pulse is not issued onto the signal lead 18a, step S43 follows.

In step S45, a signal level "1" is outputted onto the signal lead 21e, namely, the operator is called by the operator calling circuit 19. Thereafter, the processing advances to step S60 which will be mentioned later.

In step S46, a timer B provided in the control unit 21 or the like is set at three seconds and this timer is started.

Next, in step S47, it is checked whether or not a command pulse has issued onto the signal lead 17a, i.e. whether the GC2 signal from the facsimile apparatus on the distant side has detected or not. When the GC2 signal has detected, the well known image receiving operation is executed in step S48. When the GC2 signal has not been received, step S49 follows.

In step S49, the timer B started in step S46 is checked to see if its time is over or not. In the case that the time is over, the processing returns to step S39. Therefore, in the loop of steps S39 to S49, the GI2 signal is sent every three seconds and in the case where the GC2 signal on the distant side has detected in step S47, the image reception in the ordinary auto reception mode is carried out in step S48. In place of the image reception shown in step S48, the auto transmission by what is called a polling may be executed as an optional function.

In step S50, it is checked whether a command pulse has issued onto the signal lead 18a or not, namely, whether 20 seconds passed after the starting of transmission of the GI2 signal or not. When 20 seconds have passed, step S51 follows. When 20 seconds have not passed yet, the processing is returned to step S47.

The processing advances to step S51 in the case where the GC2 signal on the distant side has not been received for 20 seconds, namely, the distant side is considered to be an ordinary voice-communication terminal. Therefore, a signal level "1" is outputted onto the signal lead 21e and the operator is called by the operator calling circuit 19.

Next, in step S52, it is checked whether a command pulse has been issued onto the signal lead 20a or not, namely, whether the telephone set button has been depressed by the operator or not. When the operator has responded to the calling of the operator calling circuit 19 by use of the telephone set button, step S53 follows. If not, the processing will advance to step S56.

In the case where the operator responded to the calling, in step S53, a signal level "0" is outputted onto the signal lead 21a and the line 10a is connected to the side of the telephone set 11 by the NCU 10. Then, in step S54, a signal level "0" is outputted onto the signal lead 21e and the calling by the operator calling circuit 19 is stopped. Thereafter, the communication is made possible by the pick-up of the handset of the telephone set 11 by the operator in step S55.

On the other hand, when a response of the operator is not obtained in step S52, it is checked to see if a command pulse was issued onto the signal lead 17a or not in step S56. Namely, it is detected to see if the GC2 signal transmitted from the facsimile apparatus on the distant side was detected or not. When the GC2 signal has been detected, step S48 follows and the image communication is performed as mentioned above. However, when it cannot be detected, step S57 follows.

In step S57, the timer B which has been set at three seconds is checked to see if its time is over or not. When three seconds have not passed yet, the processing is returned to step S52 and the operation for waiting for the response of the operator or for reception of the GC2 signal is repeated. When three seconds have passed, step S58 follows.

In step S58, the timer A which has been set at the initial identification time interval of 35 seconds is checked to see if its time is over or not. When the initial identification time interval has finished, the processing advances to step S40 and after initialization, the apparatus returns to the standby mode. When 35 seconds have not passed yet, the processing advances to step S59.

The processing advances to step S59 within the initial identification time interval and in the case where three seconds have passed from the transmission of the GI2 signal. Therefore, a command pulse is issued onto the signal lead 21c and the GI2 signal is sent. Next, in step S60, it is checked to see if a command pulse was issued onto the signal lead 14b or not, i.e., the apparatus waits for the end of transmission of the GI2 signal. As long as the transmission of the GI2 signal has not finished yet, step S61 is executed and step S60 is repeated. In step S61, the state of the output signal lead 20a of the telephone set key depression detector 20 is checked to see if the operator was called or not. When the operator has responded, the processing then advances to step S53.

When the end of transmission of the GI2 signal is confirmed in step S60, step S62 follows, where the timer B is reset at three seconds and is started. Then, the processing is returned to step S52 and the above-mentioned loop is again executed. In this loop, the GI2 signal is sent every three seconds for the initial identification time interval after the elapse of the first twenty seconds and the operator is called. In this state, the apparatus waits for the GC2 signal on the distant side or the response of the operator.

According to the above embodiment, the following operations can be realized. Namely, in the case where the GC2 signal cannot be received even when the CED signal is sent and the GI2 signal is repeatedly transmitted for 20 seconds, the operator is called by an artificial bell sound or the like, and during this interval, the GI2 signal is transmitted and the apparatus waits for the GC2 signal or a response of the operator for the initial identification time of 35 seconds. With such an arrangement, even when the apparatus has been set into the auto reception mode, it is possible to process both the outgoing call for the purpose of communication from an ordinary telephone set and the outgoing call for the purpose of image communication from a facsimile apparatus without causing a problem. For an outgoing call from an ordinary telephone set, the operator is called by the operator calling circuit. At this time, when the operator responds by means of the telephone set button or the like, the line is connected to the telephone set, so that the communication can be done similarly to an ordinary telephone set. On the other hand, when the apparatus receives an outgoing call from a facsimile apparatus, the automatic communication can be performed similarly to a conventional one. Therefore, the annoying switching operation is unnecessary and the manual mode function can be also omitted. Further, a shown in FIG. 2, the present ivention can be implemented using only conventional well known members and can be simply and cheaply constituted.

Although an example of the facsimile apparatus in the G2 mode has been described in the foregoing embodiment, the constitution of the invention can be obviously also applied to equipment in another mode or a multi-use apparatus in a plurality of modes. For example, in the case of G3 equipment, a DIS signal may be sent in place of the GI2 signal and a DCS signal may be detected in place of detecting the GC2 signal. In addition, the set time of the timer shown in the above embodiment is not limited to the above time but it can be freely set within a range based on CCITT Recommandation or other specifications. Or, the operator may variably set it. Also, the timers shown in the above embodiment may be obviously constituted by software.

As will be apparent from the above description, according to the present invention, in a communication apparatus which is connected to a terminal of a telephone line together with a telephone set and starts predetermined communication when a predetermined control signal has been exchanged between the terminal on the distant side and the terminal on this side, this apparatus is provided with time-counting means for time counting a predetermined time, means for detecting the above-mentioned predetermined control signal from the terminal on the distant side, and means for calling an operator, wherein the operator calling means is made operative in the case where the predetermined control signal from the terminal on the distant side could not detected by the detecting means for the time interval set in the time-counting means. As a result it is possible to provide an excellent communication apparatus which can receive an outgoing call from an ordinary telephone set without causing a problem and can perform the automatic communication equivalent to the conventional one by a simple and cheap constitution without requiring the annoying switching operation. Consequently, according to the apparatus of the present invention, even a user who has only one telephone line contracted can efficiently use the line and the operation is simple and the burden for the user can be reduced.

What is claimed is:

1. A facsimile receiving apparatus comprising:
   first detecting means for detecting an establishment of a communications link between said receiving apparatus and distant apparatuses, including a transmitting facsimile apparatus;
   signal sending means for sending an image reception mode signal in response to the detecting result of said first detecting means;
   second detecting means detecting for a response signal which is sent by said transmitting facsimile apparatus in response to the image reception mode signal, the response signal including a signal representing an image transmission mode of the transmitting facsimile apparatus;
   operator calling means for generating a calling signal for an operator when said second detecting means does not detect the response signal from said transmitting facsimile apparatus within a predetermined period of time; and
   means for enabling facsimile information transfer from said transmitting facsimile to said receiver facsimile apparatus when said second detecting means detects the response signal within said predetermined period of time.

2. An apparatus according to claim 1, further comprising speech enabling means for enabling a speech operation when said second detecting means does not detect the response signal within said predetermined period of time.

3. An apparatus according to claim 2, wherein said speech enabling means is adapted to connect a communication line with a telephone station.

4. An apparatus according to claim 1, wherein said first detecting means detects a ringing signal.

5. An apparatus according to claim 1, wherein said operator calling means generates a tone.

* * * * *